United States Patent [19]
Glance et al.

[11] Patent Number: 5,597,205
[45] Date of Patent: Jan. 28, 1997

[54] ENERGY ABSORBING RESTRAINT SEAT BACK RECLINER FOR APPLICATION ON A RESTRAINT SAFETY SEAT

[75] Inventors: Patrick M. Glance; Brad M. Glance, both of Plymouth, Mich.

[73] Assignee: Concept Analysis Corporation, Plymouth, Mich.

[21] Appl. No.: 202,818

[22] Filed: Feb. 25, 1994

[51] Int. Cl.⁶ .................................................. B60N 2/22
[52] U.S. Cl. ............................... 297/362.14; 297/362.11; 297/216.1
[58] Field of Search .......................... 297/361.1, 362.11, 297/362.12, 362.13, 362.14, 378.11, 378.12, 216.1, 216.13, 216.14

[56] References Cited

U.S. PATENT DOCUMENTS

| | | | |
|---|---|---|---|
| 4,394,047 | 7/1983 | Brunelle | 297/362.12 |
| 4,402,547 | 9/1983 | Weston et al. | 297/362.11 X |
| 5,123,706 | 6/1992 | Granzow et al. | 297/362.11 X |
| 5,246,271 | 9/1993 | Boisset | 297/362.13 |
| 5,280,999 | 1/1994 | Jones et al. | 297/362.14 X |
| 5,306,073 | 4/1994 | Rees | 297/362.14 |
| 5,318,341 | 6/1994 | Griswold et al. | 297/362.11 |
| 5,320,413 | 6/1994 | Griswold et al. | 297/362.14 X |

*Primary Examiner*—Peter R. Brown
*Attorney, Agent, or Firm*—Waters & Morse, P.C.

[57] ABSTRACT

A restraint seat back recliner construction with a high strength double-wall recliner body that packages a lead screw mechanism inside the body to create a shoulder belt load carrying, single-sided, recliner system. A unique slot in the lower body is employed that guides the movement of a traveling nut pinion at the end of a lead screw and connects the upper and lower body, thereby providing reclining action and acting as a secondary safety stop mechanism. A unique end detail of a guide slot and a lead screw end pinion design permits controlled occupant deceleration during a frontal vehicle crash. Application of two-door, four-door, power, manual, single and double sided recliners are shown.

10 Claims, 4 Drawing Sheets

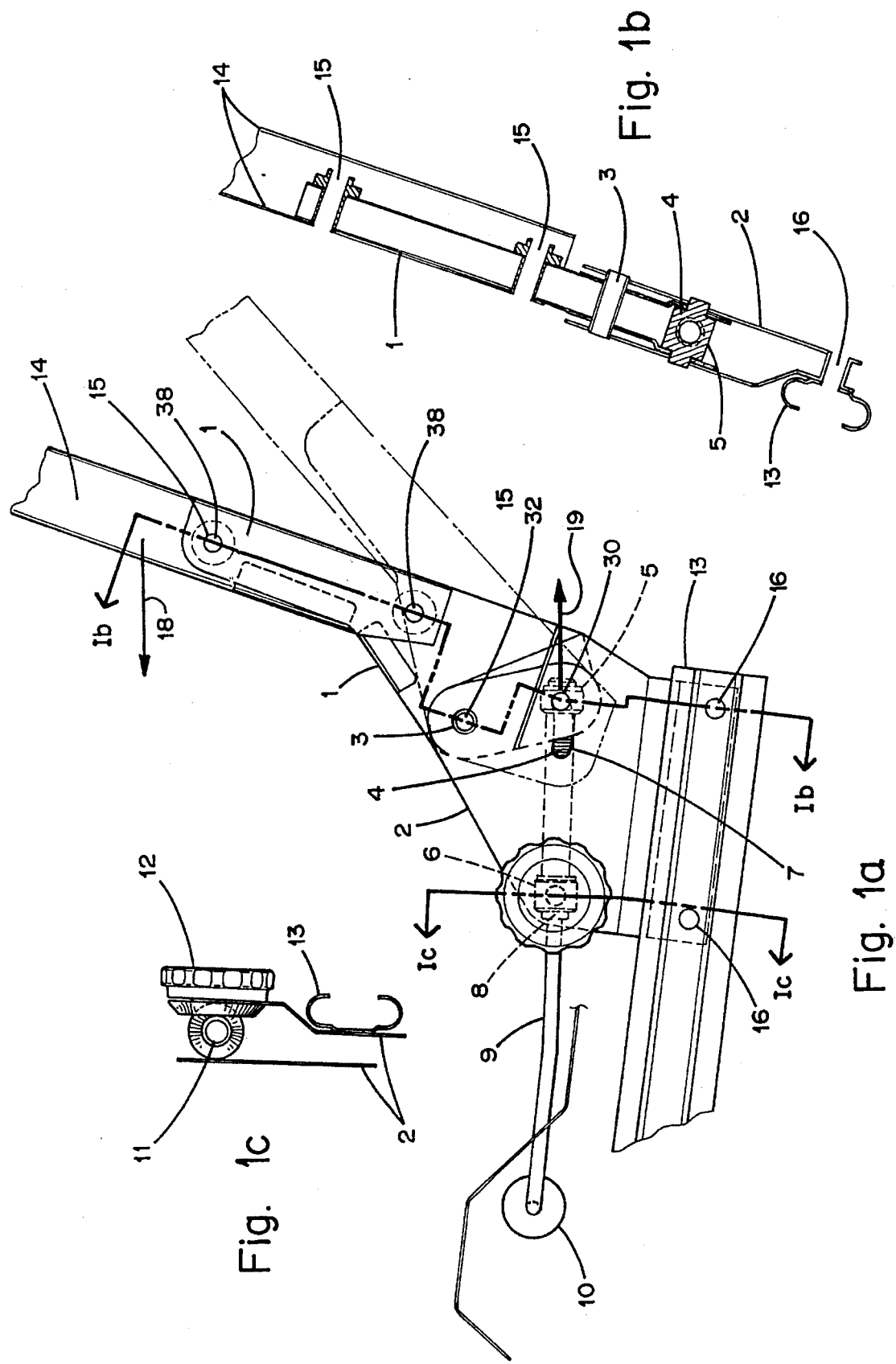

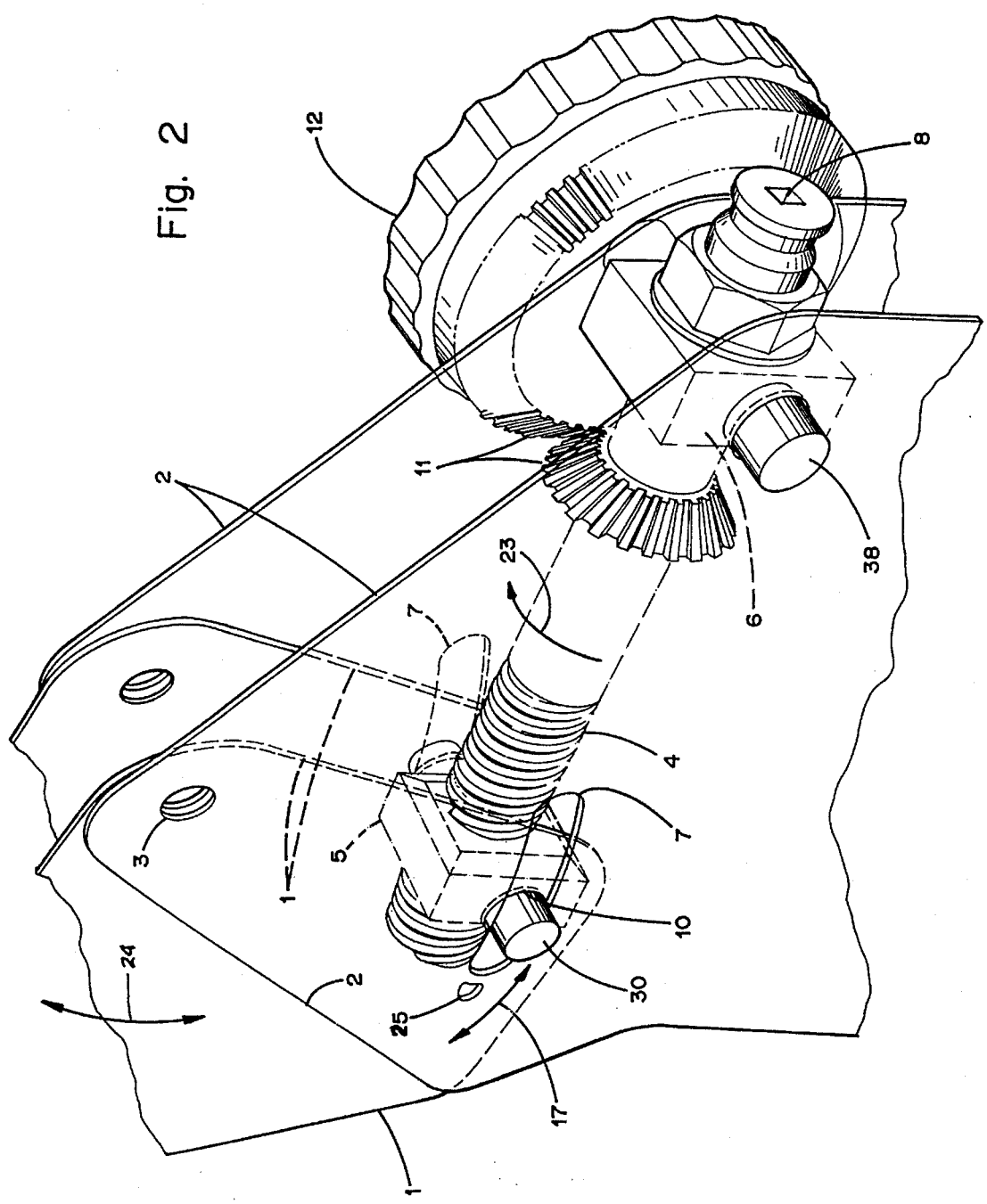

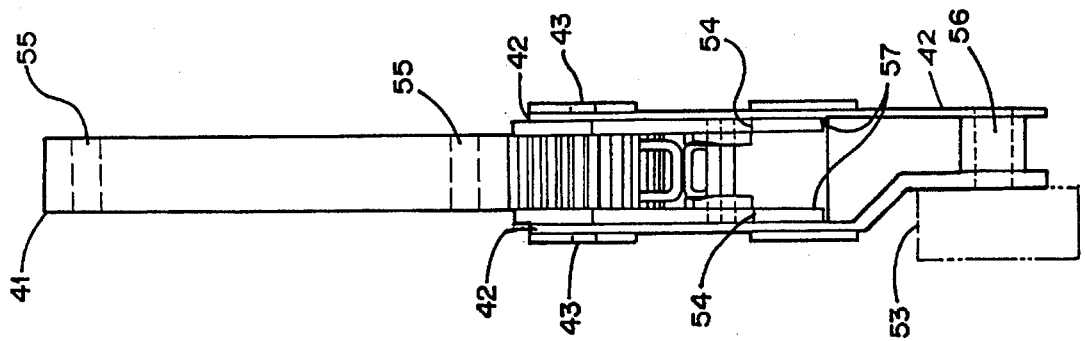
Fig. 3b
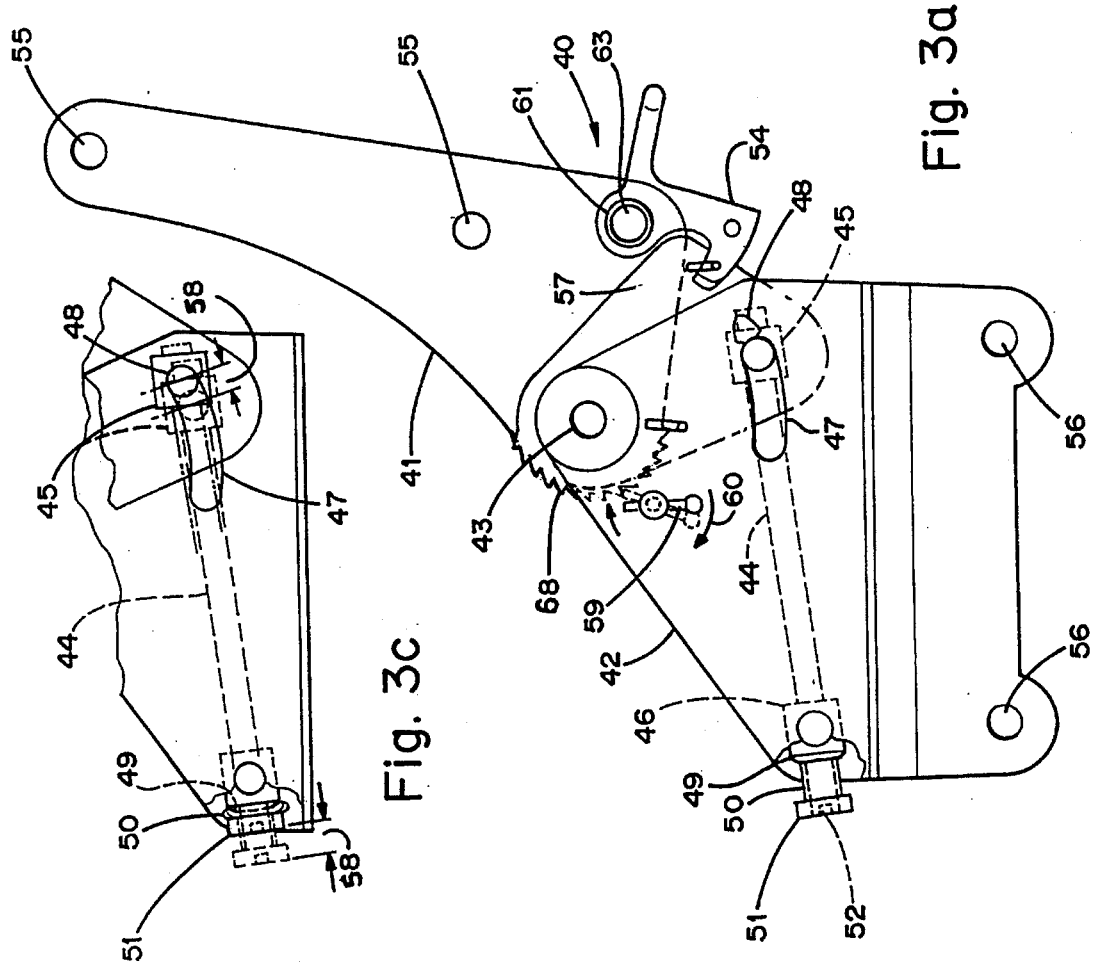
Fig. 3a
Fig. 3c

ENERGY ABSORBING RESTRAINT SEAT BACK RECLINER FOR APPLICATION ON A RESTRAINT SAFETY SEAT

BACKGROUND OF THE INVENTION

Many or most current seat recliners "work" on the principle of mesh gear teeth mounted on a rotating shaft. Partial (sector) gear and planetary gear systems are commonly utilized. Another common current seat recliner mechanism is a sliding cylinder mechanism within a locking spring "Porter" device. Both provide a mechanism to recline a seat back relative to the lower seat frame.

An object of the present invention is to provide an improved recliner mechanism for a vehicle seat that is strong, compact, and relatively inexpensive. Another object of the present invention is to provide a recliner that is continually adjustable and has improved safety characteristics under crash conditions, especially when the invention is used for "restraint seating", which is seating wherein the upper end of a shoulder safety belt is mounted to the seat back itself, such that the seat back restrains crash stresses.

SUMMARY OF THE INVENTION

In accordance with the present invention, an improved structural restraint seat back recliner consisting of a drive mechanism packaged inside a high strength recliner body. The recliner body reacts occupant belt loads that are attached to the seat frame and has unique features to mount and control the internal mechanism travel.

The drive mechanism is a lead screw (also called a power screw or worm screw) mechanism or a ball screw. A ball screw is similar to a lead screw but has less friction. The screw mechanism is utilized with one moving and one stationary pinion. The screw can be driven manually or powered by an electric motor and appropriate gear set.

The recliner body includes two plates spaced apart on either side of the drive mechanism to provide good structural support to the mechanism that reacts or resists high restraint loads. The body upper is further closed-off to form a partial box section to create improved torsional stiffness. The body attachment members for connecting the body plates together are sleeved and positioned side by side over the plates to improve structural performance.

This design application allows the use of a single sided restraint recliner. The term single sided means the seat back has a freely pivoting hinge on one side of the seat back and a locked recliner mechanism on the other side. A dual recliner system has a passive lock mechanism on both sides. The single sided recliner has advantages of lower cost, and dual sided recliners have the advantage of improved stiffness on the inboard side of the upper seat back.

The present invention includes an improved slot design in the lower body that limits the range of recliner travel during normal seat operation. However, the slot acts as a design safety feature for a restraint seat under crash conditions, wherein the end of the slot deforms under severe loads to increase forward seat travel limits while dissipating stress. The end detail of the recliner slot is designed to provide controlled recliner deformation which results in controlled occupant deceleration and occupant energy absorption. There are many variations possible for an energy absorbing recliner with a threshold break away sliding shaft and designed mechanical resistance to movement.

The present invention is a good design solution for four-door recliners in that the recliner system is always engaged and has infinite adjustment by virtue of use of a lead screw. The restraint guide slot recliner body adds a secondary safety feature for restricting recliner forward movement in the event that the internal mechanism fails. The design safety stop slot can be utilized on both sides of the seat, either with double or single sided recliners and can also be utilized in conjunction with a pivot on the inboard side to restrict four-door recliner forward rotation.

The present invention adds a split upper body with a hook latch to permit a two-door forward dumping recliner. Since a forward dumping recliner could be potentially disengaged during a frontal vehicle crash, a secondary inertia latch device is designed to improve occupant safety for a restraint seat.

The present invention has application to two-door and four-door recliners, power and manual recliners, and singled and double sided recliners.

The use of a tightly packaged recliner mechanism employing a linear drive such as a power screw or ball screw packaged inside a high strength upper and lower body of the recliner provides an extremely strong mechanism to adjust the seat back angle at a reasonable low weight, cost and relatively small vehicle package. The design meets the needs of infinite seat back angle adjustment, with continuous seat latch engagement.

The present invention shows two basic types of recliners: a power recliner and a manual recliner. Both are four door vehicle recliners where there is no need for a "quick dump" (forward pivoting) feature to provide access to the rear seat for ingress and egress. The four door recliner version has the advantage of positive engagement at all modes of operation. This is an extremely safe and desirable feature for a safety restraint seat that mounts the upper shoulder belt on the seat back frame. The seat recliner screw mechanism is designed to withstand the loading of a 35 mph vehicle collision by itself, and it has a secondary fail-safe feature of limited travel, as the upper and lower body slide relative to one another within a guide slot. The recliner is locked from further rotation by virtue of the slot limiting feature and will prevent seat rotation if the lead screw fractures at loading greater than created during a 35 mph vehicle collision.

In another aspect of the present inventione a two door recliner is produced by modifying the upper recliner body to dump (pivot) forward.

Other features of the recliner mechanism of the present invention are:

Inertia Lock Feature

One method to prevent seat rotation during an automotive collision is with the use of an inertia lock located at the recliner pivot. An inertia mechanism locks-up at a predetermined g level and engages a gear with a stop plate, attached to the upper and lower recliner body respectively. This feature provides a secondary latch feature for a two-way forward dump latch in the event the pivoting latch is not engaged during a vehicle forward crash. The advantage of the inertia lock is that it permits down-sizing of the lead screw and/or utilizing a more conventional light weight recliner mechanism to provide normal seat recliner usage whereby depending on the inertia lock during a crash situation, along with the seat recliner body limiting slotted travel feature.

Power Recliner Feature

The power recliner has the advantage of smooth, easy recliner operation by virtue of an electric motor rotation of the lead screw powered in either forward or reverse. Advancement of the lead screw moves the pinion relative to the lead screw to provide movement of the recliner upper body and pivot about the recliner pivot point.

Manual Recliner Feature

For the manual recliner, a hand-wheel "knob" is turned manually to provide the same movement with some effort, but at a low cost versus the power recliner. The manual option may utilize a double lead thread (change of screw pitch) to reduce the number of revolutions of the knob to recline the seat back. In addition to a screw, a linear sliding mechanism can be utilized that operates by lever instead of a hand wheel knob. The mechanism can be down-sized, and downgaged for application of a non-restraint seat where there are lower structural requirements. Design analysis indicates the present invention power or manual screw recliner, with a magnesium housing, is approximately three times stronger at nearly the same weight of a current steel recliner.

DESCRIPTION OF THE DRAWING

FIG. 1A–1C are a side view and end views of a four-door steel recliner assembly and adjacent seat components.

FIG. 2 is a partial perspective of the recliner of FIG. 1, showing detail of the mechanism and attachment to the recliner body.

FIGS. 3A and 3B are a side view and end view scaled drawing of a two-door magnesium recliner with energy absorbing mechanism and features. FIG. 3C is a partial side view of the FIG. 3A recliner showing slot deformation during overtravel caused by impact.

DESCRIPTION OF THE PREFERRED EMBODIMENT

Figure 4C:
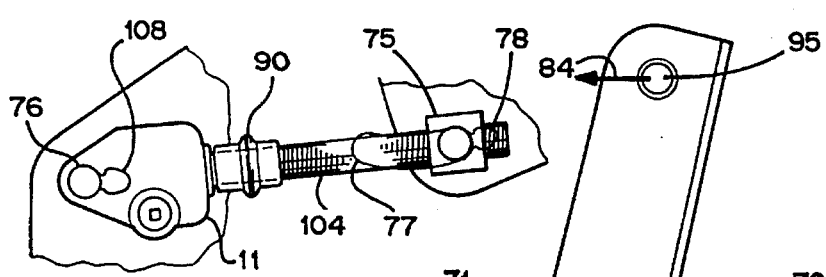
FIG. 4C shows a modification of the recliner of FIG. 4A.

A recliner side view and projected end view are shown in FIGS. 1A–1C. The upper recliner body 1 is attached to the upper seat back 14 at fastener openings 15 and to the lower recliner body 2 by a pivot shaft 32 at the common pivot hole 3. A lead screw 4 is attached to the upper body through the drive nut travelling pinion 5, which has a pin 30 extending from the sides thereof. The other end of the lead screw is mounted to the stationary pinion 6. The stationary pinion 6 is pivot mounted to the lower body and the pin on moving pinion 5 travels in a guide slot 7 in the lower body. The moving pinion 5 is also pivot mounted to the upper body. Rotation of the lead screw by drive cable 9 and remote motor 10 causes the pinion nut 5 to travel axially along the lead screw length and along the path of the slot to move the upper body relative to the lower body, creating rotation (reclining) of the seat back 14 around pivot shaft 32.

Also shown in FIGS. 1 and 2 is the option of a manual recliner where the same or similar lead screw mechanism is driven by a hand wheel 12 that turns a bevel gear 11 mounted so as to rotate the lead screw. The upper body comprises a hollow, closed section beam that increases in cross-sectional area as the body extends downwardly to a position approaching the lower end of the body, where the bending moment is greatest.

The lower body 2 is attached to the seat track 13 by sleeved attachment holes 16 to improve structure. The seat track is mounted to the vehicle structure by a floor-mounted pedestal or the like.

During a frontal vehicle crash, the seat back upper shoulder belt bending moment load 18 is reacted at 19 through the upper body and moving pinion. The screw thread prevents axial movement of nut pinion 5 and transfers the load to the stationary pinion 6 and through the lower recliner body directly to the seat tracks.

The end view of the recliner in FIG. 1B shows the relative in-line center axis of the recliner, seat track, and back structure to provide an efficient structural system with minimum eccentric loading and minimum mass.

A partial perspective view of the restraint load carrying recliner is shown in FIG. 2. The mechanism is packaged in between spaced plates defining the upper 1 and lower body 2 housings. The upper and lower body both have a pivot hole 3 through which the pivot shaft 32 extends to connect the two bodies and create a pivot location for the recliner. The lower body has a slot 7 for the traveling pinion guide and the upper body has a round hole 10 for the pin mounted to the traveling pinion 5, such that movement of the traveling pinion nut 5 creates rotation (reclining) of the upper body relative to the lower body.

The traveling pinion nut is moved linearly or axially by rotation of the lead screw 4 that is threaded for part of its length. The smooth shaft portion of the lead screw rotates in the stationary pinion 6 that is connected by pin 38 to a hole in the lower body.

A drive shaft connection 8 with appropriate keyed end is employed to connect a drive cable and the cable is turned either by a remote motor or a manual handle wheel 12.

Arrow 17 (FIG. 2) represents near linear movement of the travel pinion nut along the lead screw and arrows 23 and 24 represents rotational movement of the screw and upper body respectively. The design end slot has unique lance opening tapper slot 25 designed to deform at crash threshold levels and provide additional controlled travel and energy absorption of the occupant by virtue of a restraint seat loading the recliner end slot.

A two door vehicle recliner 40 is shown in FIGS. 3A–3C, which represent a scaled side view, an end view, and a partial side view of the mechanism after crash load displacement.

Similar to FIG. 1, the upper body 41 is connected to the die cast magnesium lower body 42 at the recliner pivot 43. A lead screw 44 has a moving pinion traveling nut 45 at intermediate double plates 57, also pivotally mounted on pivot 43, are positioned between upper body 41 and lower body 42. Intermediate double plates 57 are attached to each side of the travelling pinion nut of the screw drive mechanism in the same manner as the travelling pinion nut is attached to the upper body of FIG. 1. A metal double hook 54 is employed to selectively block pivotal movement of upper body 41 with respect to intermediate plates 57. One end and a stationary pinion 46 at the other end. The moving pinion rides in a guide slot 47 in the lower body and the end of the guide slot 48 has a unique stop tap and tapping end to resist pinion movement at a controlled collapse rate.

While die cast magnesium is a preferred construction of the lower body in all embodiments, the lower body as well as the upper body also could be formed of other high strength material such as martensitic steel, high strength steel, or aluminum. A composite plastic also could be employed. The lead screw mechanism is case hardened.

A press-on bushing 49 is located next to the lead screw shaft to resist pinion shaft movement. However, the bushing 49 is designed to break loose from the shaft and slide at a threshold crash load such as 10,000 pounds axially. The lead screw shaft, which is smooth at this end, will slide through the stationary pinion, resisted by slot end 48, and crushable sleeve member 50 thereby permitting forward displacment of the recliner, seat back, and occupant shoulder belt at a controlled rate to absorb occupant impact energy. FIG. 3C shows the displaced lead screw 44, pinion 45, crushed sleeve 50 and displacement 58 of the shaft assembly end points under a vehicle crash load.

A nut 51 is at the end of the lead screw shaft to limit shaft travel, and a key 52 is at the shaft end center used to drive and rotate the lead screw to create normal recliner movement.

A metal double hook 54 is utilized to latch to the intermediate double plate 57. They are connected with a circular return spring 61 mounted around pivot axis 63. Occupant release of hook 54 allows dumping of the recliner upper body forward. An inertia latch consisting of a pivoting metal bar 59 having a weighted lower end pinned to the lower body and a set of metal teeth 68 spaced around the pivot axis of the upper body. In the event of a forward designated g-level, such as three g's (deceleration three times the force of gravity), the weighted lower end of bar 59 will swing forward as shown by arrow 60 to engage teeth 68 and lock-up and or resist forward recliner rotation. Therefore the inertia latch serves as a secondary recliner safety lock. Bar 59 will swing back to unlock position at normal one g gravity. Item 53 is the seat track, shown for reference.

Figure 4A:
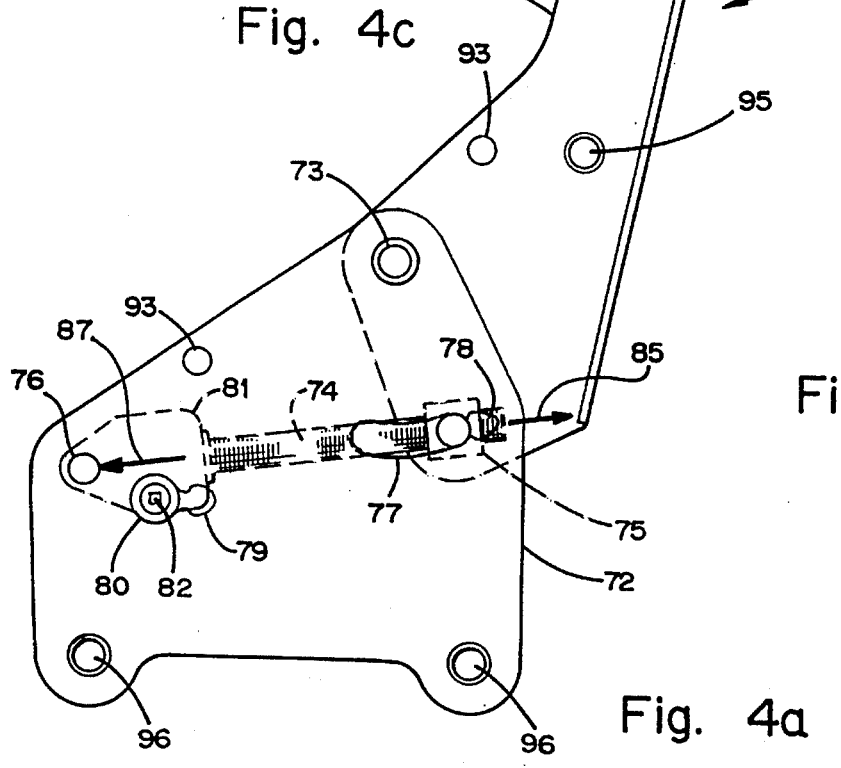
FIGS. 4A and 4B are a side view and end view of a four-door metal recliner with an internal right angle drive gear set and energy absorbing housing slot feature.
Figure 4B:
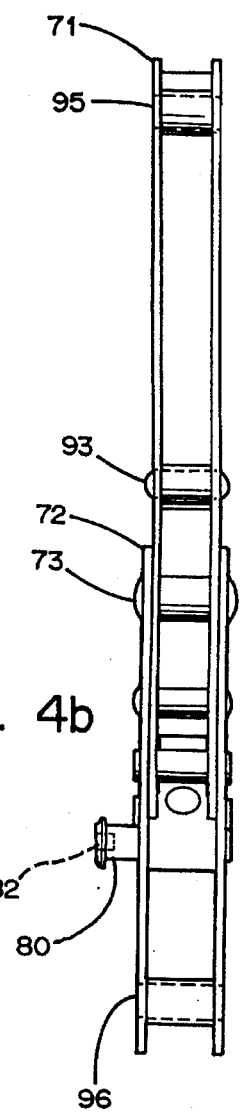

FIGS. 4A and 4B show a side view and end view of a four door metal fabricated recliner 70 with an internal lead screw 74 and traveling nut pinion 75 pinned to the upper body 71 and riding in a slot 77 in the lower body 72.

A right angle gear set is contained in housing 81 and pin-mounted to the lower body at 76. An extension drive shaft 80 exits the lower body through a round hole with a unique end slot treatment 79, which is similar to the energy absorbing end slot 78 at the traveling nut pinion. When a forward occupant upper shoulder belt load is applied, as shown by arrow 84 on the recliner body, it is reacted by the traveling nut pinion 75, as shown by arrow 85. The nut transfers the load to pivot mounting end of the lead screw mechanism at 76 and is resisted as shown by arrow 87.

At a prescribed threshold force level, pinion mount 76 can elongate and/or fracture causing the lead screw to displace in the direction of arrow 85. This displacement is resisted by narrowing end slots 78 and 79 against the pinion and right angle drive shaft respectively. The continued displacement along the slot at a designated resistance force generate energy absorption and promotes occupant torso safe deceleration.

Similar to other figures, a drive key shaft 82 is at the end of extension drive shaft 80. The upper recliner body is mounted to the seat back at fastener openings 95, and lower recliner body is mounted to the seat track fastener openings at 96. Stand-off rivets 93 are utilized in the construction of the double wall recliner bodies to join the wall and help create an improved structure.

A displaced partial side view of an alternative mechanism is shown in FIG. 4C, with the same mechanism components having the same numbers as in FIG. 4a, i.e., energy absorber end slots 78, a front pivot mount 76 for the mechanism assembly, and guide slot 77. New is a split lead screw 104 having an energy absorbing elongation sleeve 90 shown crimped over the split ends of the lead screw, such that at threshold axial force levels, the sleeve will elongate by virtue of its hump-back design, thereby causing controlled, limited displacement with additional resistance. Further resistance is created at gear housing mounting end slot 108.

We claim:

1. An automotive seat safety restraint recliner for mounting a seat frame to a back frame comprising:

high strength upper and lower body members that are pivotally joined by a recliner pivot pin, the lower body member comprising a pair of longitudinally extending and laterally spaced support plates, the upper body member comprising spaced side walls that are mounted on the pivot pin and fit inside and abut the support plates of the lower body member, the lower body support plates providing outer reinforcement for the upper body side walls where they overlap;

a rotatable lead screw mechanism mounted inside the lower body member between the lower body support plates and below the pivot pin joining the upper and lower body members, the lead screw mechanism comprising a lead screw threadably supported at one end in a travelling pinion nut attached on opposite sides to the upper body side walls at a position inside the lower body support plates, another end of the lead screw being rotatably mounted to a fixed pinion attached at opposite sides to the lower body support plates, the travelling pinion having a pin extending from opposite lateral sides thereon, the pin extending through openings in both side walls of the upper body member and riding in a guide slot in each of the lower body support plates;

rotation of the lead screw creating travel of the travelling pinion nut in the Guide slots and causing pivotal movement of the upper body member relative to the lower body member;

the upper body member being attached to the back frame and an occupant upper shoulder belt being attached to a top of the back frame, such that the recliner resists forward loading created from the shoulder belt during a frontal vehicle crash situation by means of a tension force exerted by the pinion and pinion nut on the lead screw;

the lower body member being attached to a vehicle seat track, which is attached to a lower vehicle structure, such that the upper belt load is transmitted through the lower body member to the lower vehicle structure.

2. A recliner as in claim 1 wherein the guide slot comprises a deformable portion at one end thereof that deformably resists further seat back forward movement when the travelling pinion pin reaches the end of the guide slot, the deformable portion thereby absorbing inertial energy and creating a secondary safety feature for a load carrying restraint seat back in the event that the mechanism breaks loose from the upper body side walls during a vehicle crash situation.

3. A recliner as in claim 1 wherein the upper body member comprises a hollow closed section beam having an increasing cross sectional area as the body extends downwardly to a position approaching a lower end of the upper body where the bending moment is the greatest.

4. A recliner body as in claim 1 where the upper and lower body members are formed of high strength materials selected from the group consisting of martensitic steel, high strength steel, aluminum, and magnesium.

5. A recliner body in claim 1 where the upper and lower body members are formed of a composite plastic material.

6. A recliner as in claim 1 wherein the upper and lower body members are formed of high strength steel, aluminum or magnesium, and the lead screw mechanism is formed of a case hardened steel.

7. A recliner as in claim 1 wherein the upper body member includes an upper member and an intermediate double plate member pivotally mounted on the pivot pin, so as to provide a two-door, dump forward recliner, the intermediate double plate member being the portion of the upper body member that is attached to opposite sides of the travelling pinion nut, the upper member being connected to the intermediate double plate member by means of a spring loaded hook that latches the upper member and double plate member together but permits unlatching of the upper member from the intermediate double plate member above the travelling pinion nut such that the seat back can be pivoted forward independent of the screw drive mechanism.

8. A recliner as in claim 7 and further comprising a secondary inertia latch device consisting of rachet teeth on the upper member that are engaged by an inertia activated pendulum level bar on the lower body member or intermediate double plate member that will create locking between the upper member and the lower body member or intermediate plate member and resist seat back rotation during a crash at a predetermined threshold deceleration level, even if the spring loaded double hook is not engaged.

9. A recliner as in claim 1 wherein the lead screw is mounted to the stationary pinion by a mounting mechanism that permits axial sliding of the lead screw relative to the stationary pinion at a given threshold stress level, axial movement of the lead screw thereafter being resisted by one or more of a deformable slot portion at one end of the guide slot and a deformable sleeve that is positioned and mounted on the lead screw so as to be crushed between an end of the lead screw and the stationary pinion as the lead screw is pulled axially through the stationary pinion.

10. A recliner as in claim 9 wherein the mounting mechanism comprises a break away bushing in the stationary pinion and the deformable sleeve is positioned between an enlargement on the end of the lead screw and the stationary pinion and being too large to fit through the stationary pinon as the lead screw slides through the stationary pinion.

* * * * *